United States Patent
Shah et al.

(10) Patent No.: US 12,538,214 B2
(45) Date of Patent: Jan. 27, 2026

(54) FAST DISCOVERY OF non-PSC CHANNEL CONFIGURED ACCESS POINT IN MULTI-CHANNEL DEVICE

(71) Applicant: MediaTek Singapore Pte. Ltd., Singapore (SG)

(72) Inventors: Nitesh Kumar Shah, Uttar Pradesh (IN); Vinay Garg, Uttar Pradesh (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 344 days.

(21) Appl. No.: 18/243,649

(22) Filed: Sep. 7, 2023

(65) Prior Publication Data
US 2024/0089842 A1    Mar. 14, 2024

(30) Foreign Application Priority Data
Sep. 12, 2022   (IN) .............................. 202221051948

(51) Int. Cl.
*H04W 48/16* (2009.01)
(52) U.S. Cl.
CPC .................. *H04W 48/16* (2013.01)
(58) Field of Classification Search
CPC ...................................................... H04W 48/16

USPC ......................................................... 455/434
See application file for complete search history.

(56) References Cited

U.S. PATENT DOCUMENTS

2021/0392571 A1* 12/2021 Kneckt ................. H04W 48/10

FOREIGN PATENT DOCUMENTS

KR          20230089740 A  *  6/2023    ............ H04W 24/08

* cited by examiner

*Primary Examiner* — Chuck Huynh
(74) *Attorney, Agent, or Firm* — Winston Hsu

(57) ABSTRACT

A multi-link device (MLD) operates in a 6 GHz band including a plurality of channels including preferred scanning channels (PSC channels) and non-preferred scanning channels (non-PSC channels), wherein the channels occupy 20 MHz of the 6 GHz band. The MLD includes: a first access point (AP), which initiates its Basic Service Set (BSS) on one of the PSC channels, and sends out Beacon, Probe Response or Fast Initial Link Setup (FILS) discovery frames for association by at least a Station (STA) scanning the 6 GHz band; and at least a second AP, which initiates its BSS on one of the non-PSC channels. The first AP includes information of the second AP in a Neighbour report (NR) or Reduced Neighbour Report (RNR) element in the Beacon, Probe Response or FILS discovery frames.

20 Claims, 4 Drawing Sheets

- 32 20MHz channels
- 24 non-PSC channels
- 8 PSC channels

- All 60 channels available for any 2 APs
- At least one AP in any of 15 PSC channels //FAST DISCOVERY OF non-PSC CHANNEL CONFIGURED ACCESS POINT IN MULTI-CHANNEL DEVICE

BACKGROUND

The invention relates to access points (APs) and communication networks, and more particularly, to a method of efficient scanning for a 6 GHz network.

In Wi-Fi 6, one in four channels is designated as a preferred scanning channel (PSC) for sending/receiving/scanning for probe requests. PSC is an active method of in-band discovery, and is currently the method by which Wi-Fi 6E client devices are allowed to send probe requests. Designating every fourth channel as a PSC leads to optimal functionality as a device does not need to scan the entire 6 GHz band.

An AP within a device will initiate a Basic Service Set (BSS) with a primary 20 MHz channel coinciding with a PSC. This allows STAs in the network scanning the 6 GHz band to discover the BSS more easily. The AP can switch the (primary) operating channel to a non-PSC if it does not expect additional (i.e. not yet associated) STAs will need to discover the BSS.

Each BSS is assigned with a BSSID, which is a 48-bit binary identifier that distinguishes it from other BSSs throughout the network. The BSSID is the MAC address of the wireless interface in the AP creating the BSS.

A device may support multiple BSS which can operate in different channels in the 6 GHz frequency band. Each AP within the device must still initiate BSS with the primary 20 MHz channel as the PSC, however. At present, there is no support for a first AP within a device to initiate its BSS in a PSC channel and for a second AP within the device to initiate its BSS in a non-PSC channel. Moreover, due to the number of channels in the 6 GHz frequency band, an STA scanning for an AP which initiates its BSS in a non-PSC will require a long time.

SUMMARY

It is therefore an objective of the present invention to minimize the number of channels for the STA to scan, in order for the connection time to be decreased.

According to an embodiment of the present invention, a multi-link device (MLD) operates in a 6 GHz band, the 6 GHz band comprising a plurality of channels including a plurality of preferred scanning channels (PSC channels) and a plurality of non-preferred scanning channels (non-PSC channels), wherein the channels occupy 20 MHz of the 6 GHz band. The MLD comprises: a first access point (AP), which initiates its Basic Service Set (BSS) on one of the PSC channels, and sends out Beacon, Probe Response or Fast Initial Link Setup (FILS) discovery frames for association by at least a Station (STA) scanning the 6 GHz band; and at least a second AP, which initiates its BSS on one of the non-PSC channels. The first AP includes information of the second AP in a Neighbour report (NR) or Reduced Neighbour Report (RNR) element in the Beacon, Probe Response or FILS discovery frames.

The MLD further comprises: a third AP which initiates its BSS on one of the non-PSC channels different from the non-PSC channel associated with the second AP. The first AP includes information of the third AP in an NR or RNR element in the Beacon, Probe Response or FILS discovery frames.

According to an embodiment of the present invention, a method for initiating multiple Basic Service Set for multiple Access Points (APs) in a multi-link device (MLD) operating in a 6 GHz band is disclosed. The 6 GHz band comprises a plurality of channels including a plurality of preferred scanning channels (PSC channels) and a plurality of non-preferred scanning channels (non-PSC channels), wherein the channels occupy 20 MHz of the 6 GHz band. The method comprises: initiating a BSS of a first AP in the MLD on one of the PSC channels; initiating a BSS of at least a second AP in the MLD on one of the non-PSC channels; and sending out Beacon, Probe Response or Fast Initial Link Setup (FILS) discovery frames of the first AP for association by at least a Station (STA) scanning the 6 GHz band. A Neighbour report (NR) or Reduced Neighbour Report (RNR) element in the Beacon, Probe Response or FILS discovery frames includes information of the second AP.

The method further comprises: initiating a BSS of a third AP in the MLD on one of the non-PSC channels different from the non-PSC channel of the second AP; wherein a Neighbour report (NR) or Reduced Neighbour Report (RNR) element in the Beacon, Probe Response or FILS discovery frames includes information of the third AP.

A reserved bit in an HE (High Efficiency) operation parameters field of an HE operation element of beacon frames and probe response frames sent by the first AP and the second AP is defined as a co-band 6 GHz BSS and is set to 1. When the co-band 6 GHz BSS field is set to 1, a co-hosted BSS element of the HE operation parameters field is false and a multiple-BSSID set is false. The first AP sends a probe response wherein the NR or RNR includes the SSID of the second AP, or sends a receiver address matching the non-PSC channel of the second AP.

The second AP sends out Beacon, Probe Response or FILS discovery frames for association by at least the STA, and an NR or RNR element in the Beacon, Probe Response or FILS discovery frames includes information of the first AP. The probe response frames may be solicited or unsolicited. The MLD is a Wi-Fi 6 MLD.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
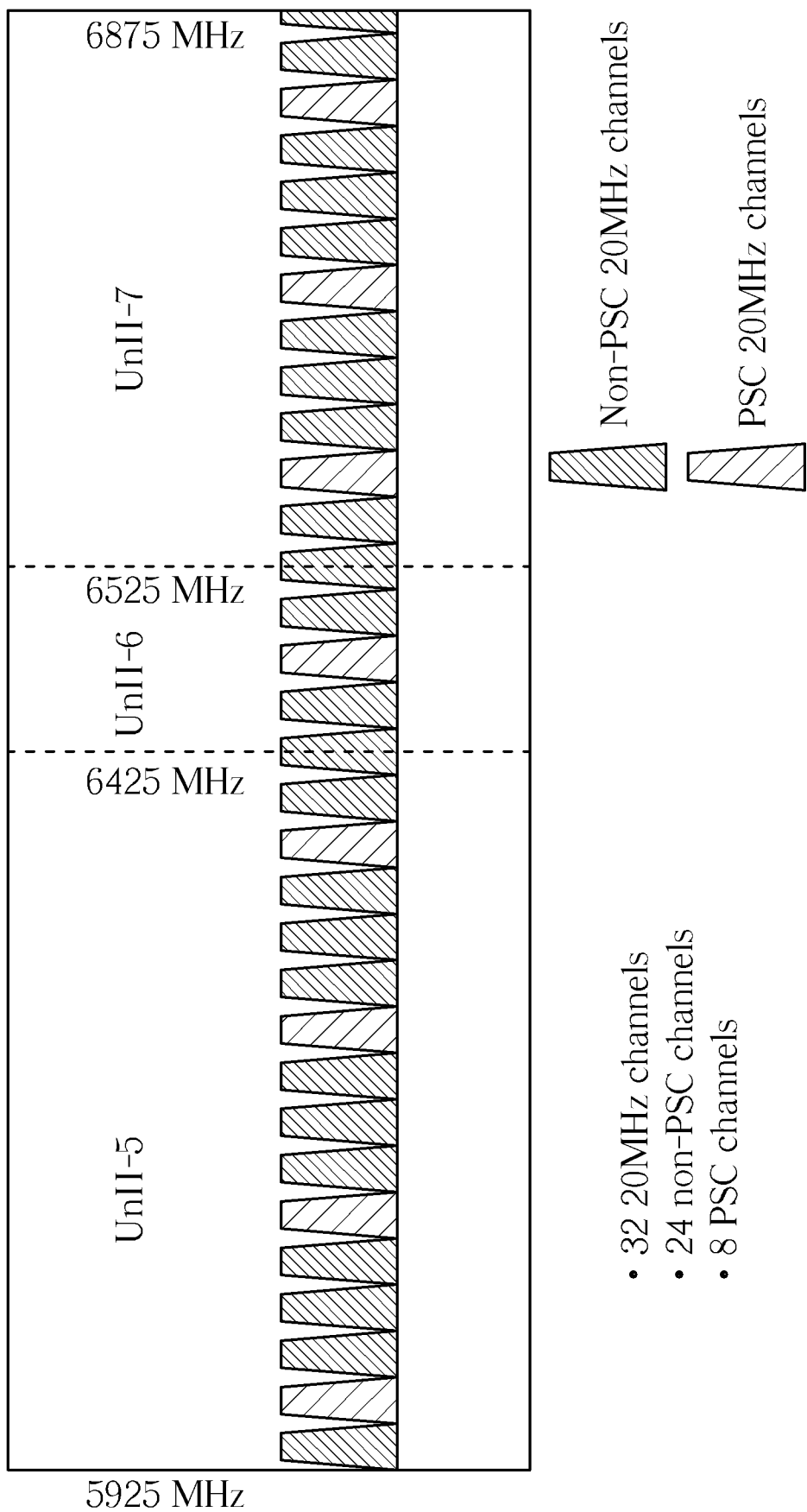
FIG. 1 is an illustration of preferred scanning channels and non-preferred scanning channels in the 6 GHz band.

Wi-Fi 6 defines a Multiple BSSID, which enables an AP to send information from multiple networks as a single beacon or probe response, so that the AP does not have to transmit a beacon frame per SSID. The following applies to multi-link devices (MLDs) for whom this multiple BSSID capability is FALSE, i.e. each AP sends its own beacon and probe response frames, and for whom a co-hosted BSS element of the HE (High Efficiency) operation parameters field is FALSE, i.e. each AP operates on a different channel. The following therefore applies to devices which support multiple BSS operating in different channels within the 6 GHz band. For such a device, all APS must initiate their BSS with a primary 20 MHz PSC channel; scanning for APs which have subsequently switched to a non-PSC channel will consume a lot of time due to the large number of channels in the 6 GHz band. In addition, the following applies to devices Refer to FIG. 1, which illustrates PSC channels and non-PSC channels in a 6 GHz band. For brevity and ease of illustration, one part of the 6 GHz band is illustrated, and fewer channels are represented. The diagram therefore illustrates are a total of 32 20 MHz channels, wherein 24 of those channels are non-PSC 20 MHz channels, and the remaining 8 of those channels are PSC 20 MHz channels. As detailed above, the ratio of PSC channels to non-PSC channels (1:3) means that a number of channels for an AP within a device to initiate its BSS is limited when the specification supports initiating BSS within a PSC channel. Further, the large number of non-PSC channels means that scanning for an AP in a non-PSC channel will take a long time.

The proposed idea is to form a co-band 6 GHz BSSID set, wherein a number of APs operate on different channels, and each AP will advertise information for their corresponding BSSID via Beacon or Probe Response frames. In order to specify that the AP operates in this co-band, a subfield in the HE operation element will be set to 1.

Figure 2:
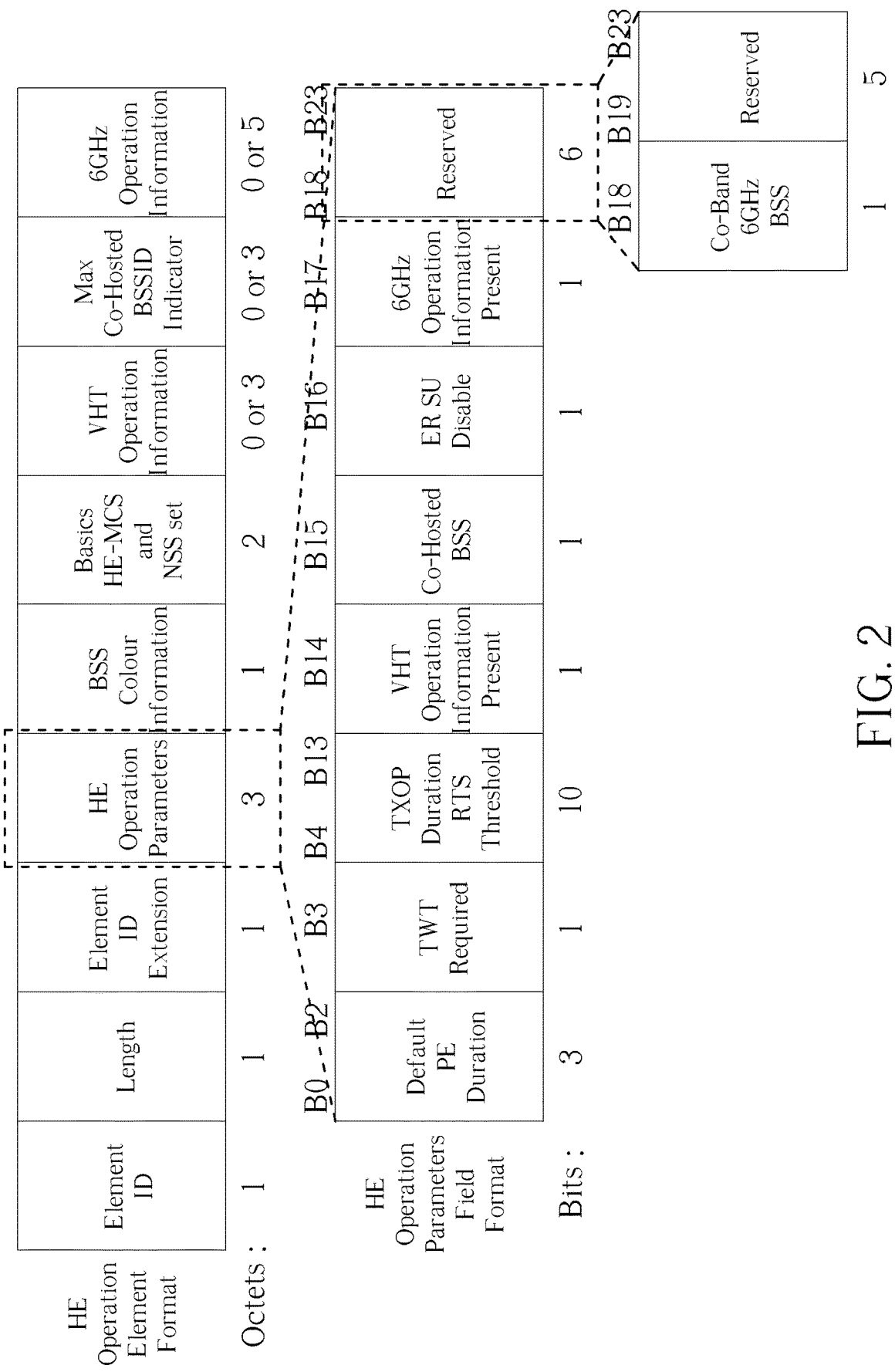
FIG. 2 is an illustration of an HE operation element format and an HE operation parameters field format.

Refer to FIG. 2, which illustrates an HE operation element, which can be found in Beacon and Probe response frames. As illustrated in the diagram, the HE operation element comprises HE Operation Parameters comprised of 3 octets, i.e. 24 bits, wherein 6 of those bits are reserved. The present invention takes one of the reserved bits (B18) and defines it as a co-band 6 GHz BSS. When this bit is set to ONE, this indicates that the AP belongs to the co-band 6 GHz BSSID set.

Assuming that a first AP within a device has already initiated its BSS with a PSC primary 20 MHz channel, then a second AP having the co-band 6 GHz BSS subfield set to ONE is able to initiate its BSS in any available channel, i.e. in a PSC channel or a non-PSC channel.

PSC is an active method of in-band discovery. The two other methods of in-band discovery are passive methods and comprise Fast Initial Link Setup (FILS) and unsolicited probe response (UPR). Probe responses may also be solicited. FILS frames are essentially condensed beacon frames which contain crucial information such as BSSID and channel, whereas probe response frames will contain all the same information contained in a beacon frame. Discovery frames and probe response frames are broadcast every 20 milliseconds. Beacon frames, probe response frames and FILS discovery frames all contain a Neighbour Report (NR) or Reduced Neighbour Report (RNR) element. As is well-known in the art, an NR report request is sent from a client to an AP. The AP will return an NR which contains information about neighbouring APs which the client can associate with, so that the client can identify potential candidates for attachment. In order to solve the issue of time-consuming scanning for an AP in a non-PSC channel, the APs operating in PSC channels can include non-PSC AP information in their Neighbour report (NR) or Reduced Neighbour Report (RNR).

APs operating in a PSC channel and receiving a Probe Request will send a probe response with the SSID of APs operating in a non-PSC channel; alternatively, they can send a Receiver Address which matches the non-PSC APs. APs operating in a non-PSC channel can include PSC APs information in the Neighbour report/reduced Neighbour report element of the Beacon, Probe response and FILS discovery frames.

Figure 3:
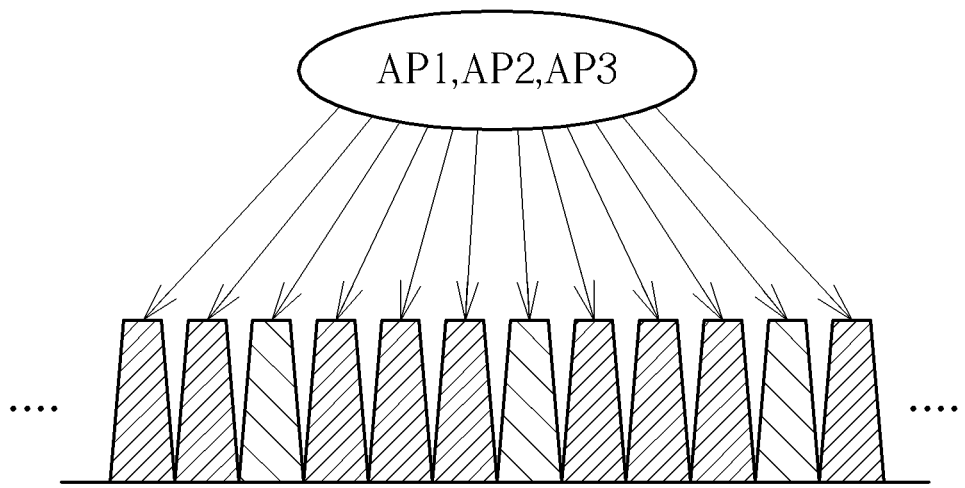
FIG. 3 is an illustration of the co-hosted BSSID according to an embodiment of the present invention.
Figure 3:
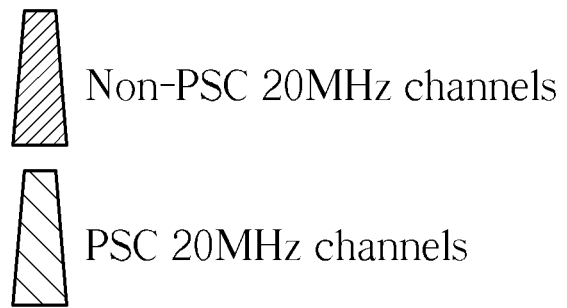

Refer to FIG. 3, which illustrates a scheme according to an embodiment of the present invention. The diagram illustrates a number of 20 MHz channels within a 6 GHz band, wherein one in four of the channels is a PSC channel, and the others are non-PSC channels. In the related art, APs can initiate a BSS with the PSC channels, meaning that for the 11 channels illustrated in FIG. 3, 3 of those channels are available. According to the embodiment of the present invention, all 11 channels are available, assuming that at least one AP is operating in a PSC channel. In the 6 GHz band, there are a total of 60 channels. Compared to the related art, wherein 15 channels are available, the entire 60 channels can be used according to the scheme of the present invention.

Figure 4:
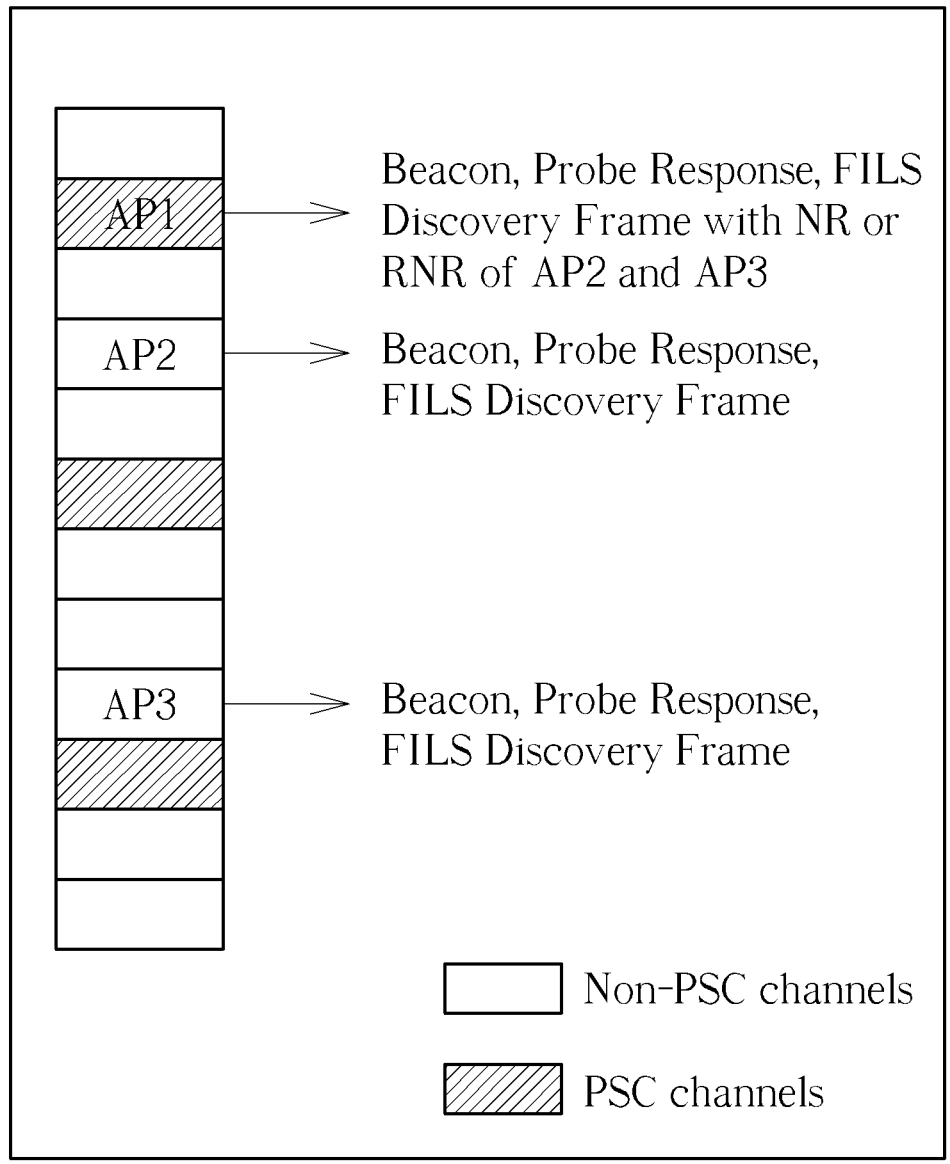
FIG. 4 is an illustration of beacons and probe responses sent by a plurality of APs according to an embodiment of the present invention.

Refer to FIG. 4, which is a diagram illustrating a device which supports 3 APs in the 6 GHz band. The APs operate simultaneously; AP1 operates in a PSC channel and AP2 and AP3 operate in non-PSC channels. The device initiates its BSS so that an STA can find it after scanning. As detailed in the background, the STA scans PSC channels to save time. In the related art, each AP will transmit a beacon, probe response, and FILS discovery frame. As AP1 is operating in a PSC channel, however, the STA will find AP1 in a scanning procedure. In the embodiment of the present invention, AP1 includes information about non-PSC APs in the NR/RNR element of the Beacon, probe response and FILS discovery frames. Once an STA discovers AP1 through scanning, it can then discover AP2 and AP3 by means of the NR/RNR, even though it does not scan non-PSC channels.

In conclusion, as long as one AP of a multi-AP supported device initiates its BSS in a PSC channel of a 6 GHz band, any other supported APs of the device can initiate their respective BSS in non-PSC channels. Due to the AP operating in the PSC channel advertising information of other supported APs, an STA scanning on PSC channels can still discover the non-PSC APs. This maintains the reduced scanning time of the related art while allowing APs to operate on non-PSC channels, which reduces crowding on PSC channels.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-link device (MLD) operating in a 6 GHz band, the 6 GHz band comprising a plurality of channels including a plurality of preferred scanning channels (PSC channels) and a plurality of non-preferred scanning channels (non-PSC channels), wherein the channels occupy 20 MHz of the 6 GHz band, the device comprising:

a first access point (AP), which initiates its Basic Service Set (BSS) on one of the PSC channels, and sends out Beacon, Probe Response or Fast Initial Link Setup (FILS) discovery frames for association by at least a Station (STA) scanning the 6 GHz band; and at least a second AP, which initiates its BSS on one of the non-PSC channels;

wherein the first AP includes information of the second AP in a Neighbour report (NR) or Reduced Neighbour Report (RNR) element in the Beacon, Probe Response or FILS discovery frames.

2. The MLD of claim 1, further comprising:
a third AP which initiates its BSS on one of the non-PSC channels different from the non-PSC channel associated with the second AP;
wherein the first AP includes information of the third AP in an NR or RNR element in the Beacon, Probe Response or FILS discovery frames.

3. The MLD of claim 1, wherein a reserved bit in an HE operation parameters field of an HE operation element of beacon frames probe response frames sent by the first AP and the second AP is defined as a co-band 6 GHz BSS field and is set to 1.

4. The MLD of claim 3, wherein when the co-band 6 GHz BSS is set to 1, a co-hosted BSS element of the HE operation parameters field is false and a multiple-BSSID set is false.

5. The MLD of claim 1, wherein the first AP sends a probe response, and the NR or RNR includes the BSSID of the second AP.

6. The MLD of claim 1, wherein the first AP sends a receiver address matching the non-PSC channel of the second AP.

7. The MLD of claim 1, wherein the second AP sends out Beacon, Probe Response or FILS discovery frames for association by at least the STA, and an NR or RNR element in the Beacon, Probe Response or FILS discovery frames includes information of the first AP.

8. The MLD of claim 1, wherein the MLD is a Wi-Fi 6 MLD.

9. The MLD of claim 1, wherein the probe response frames are solicited.

10. The MLD of claim 1, wherein the probe response frames are unsolicited.

11. A method for initiating multiple Basic Service Set for multiple Access Points (APs) in a multi-link device (MLD) operating in a 6 GHz band, the 6 GHz band comprising a plurality of channels including a plurality of preferred scanning channels (PSC channels) and a plurality of non-preferred scanning channels (non-PSC channels), wherein the channels occupy 20 MHz of the 6 GHz band, the method comprising:
initiating a BSS of a first AP in the MLD on one of the PSC channels;
initiating a BSS of at least a second AP in the MLD on one of the non-PSC channels; and
sending out Beacon, Probe Response or Fast Initial Link Setup (FILS) discovery frames of the first AP for association by at least a Station (STA) scanning the 6 GHz band;
wherein a Neighbour report (NR) or Reduced Neighbour Report (RNR) element in the Beacon, Probe Response or FILS discovery frames includes information of the second AP.

12. The method of claim 11, further comprising:
initiating a BSS of a third AP in the MLD on one of the non-PSC channels different from the non-PSC channel of the second AP;
wherein a Neighbour report (NR) or Reduced Neighbour Report (RNR) element in the Beacon, Probe Response or FILS discovery frames includes information of the third AP.

13. The method of claim 11, wherein a reserved bit in an HE operation parameters field of an HE operation element of beacon frames or probe response frames is defined as a co-band 6 GHz BSS and is set to 1.

14. The method of claim 13, wherein when the co-band 6 GHz BSS is set to 1, a co-hosted BSS element of the HE operation parameters field is false and a multiple-BSSID set is false.

15. The method of claim 11, further comprising:
sending a probe response of the first AP, wherein the NR or RNR includes the SSID of the second AP.

16. The method of claim 11, further comprising:
sending a receiver address matching the non-PSC channel of the second AP.

17. The method of claim 11, further comprising:
sending out Beacon, Probe Response or FILS discovery frames for association by at least the STA, wherein an NR or RNR element in the Beacon, Probe Response or FILS discovery frames includes information of the first AP.

18. The method of claim 11, wherein the MLD is a Wi-Fi 6 MLD.

19. The method of claim 11, wherein the probe response frames are solicited.

20. The method of claim 11, wherein the probe response frames are unsolicited.

* * * * *